United States Patent [19]

Das et al.

[11] 4,435,474

[45] Mar. 6, 1984

[54] AQUEOUS SIZING COMPOSITION AND SIZED GLASS FIBERS AND METHOD

[75] Inventors: Balbhadra Das; L. Dow Moore, both of Allison Park, Pa.

[73] Assignee: PPG Industries, Inc., Pittsburgh, Pa.

[21] Appl. No.: 363,197

[22] Filed: Mar. 29, 1982

Related U.S. Application Data

[62] Division of Ser. No. 273,791, Jun. 15, 1981, Pat. No. 4,338,233.

[51] Int. Cl.$^3$ ............................................. D02G 3/00
[52] U.S. Cl. .................................... 428/391; 65/3.41; 65/3.44; 428/392
[58] Field of Search ............... 428/391, 392, 375, 378, 428/473, 415, 446, 447; 65/3.41, 3.43, 3.44; 206/416, 502; 523/410

[56] References Cited

U.S. PATENT DOCUMENTS

| | | | |
|---|---|---|---|
| 2,946,701 | 7/1960 | Plueddemann | 117/72 |
| 2,974,062 | 3/1961 | Collier | 65/3.44 X |
| 3,245,938 | 4/1966 | Dennis | 260/29.6 |
| 3,366,507 | 1/1968 | Wilkinson | 117/138.8 |
| 3,437,517 | 4/1969 | Eilerman et al. | 117/126 |
| 3,449,281 | 6/1969 | Sullivan et al. | 260/292 |
| 3,459,585 | 8/1969 | Killmeyer et al. | 117/76 |
| 3,533,768 | 12/1970 | Wong et al. | 65/3 |
| 3,534,004 | 12/1970 | Luvisi | 260/78.5 |
| 3,556,754 | 1/1971 | Marsden et al. | 65/3.41 |
| 3,827,230 | 8/1974 | Marzocchi et al. | 57/140 G |
| 3,936,285 | 10/1974 | Maaghul | 65/3 C |
| 3,997,306 | 12/1976 | Hedden | 65/3 C |
| 4,009,132 | 2/1977 | Furukawa et al. | 260/29.2 UA |
| 4,029,623 | 6/1977 | Maaghul | 260/29.6 RW |
| 4,038,243 | 7/1977 | Maaghul | 260/40 R |
| 4,049,597 | 9/1977 | Motsinger | 260/18 EP |
| 4,049,865 | 9/1977 | Maaghul | 428/391 |
| 4,110,094 | 8/1978 | Motsinger | 65/3 C |
| 4,126,729 | 11/1978 | Richardson et al. | 428/389 |
| 4,131,693 | 12/1978 | Wendt et al. | 427/117 |
| 4,151,139 | 4/1979 | Hochreuter | 260/29.2 EP |
| 4,178,326 | 12/1979 | Stevenson et al. | 525/176 |
| 4,215,175 | 7/1980 | Tucker | 428/375 |
| 4,222,918 | 9/1980 | Zentner et al. | 260/29.2 EP |
| 4,235,764 | 11/1980 | Dereser et al. | 260/29.6 NR |
| 4,309,326 | 1/1982 | Sage et al. | 428/391 X |
| 4,338,234 | 7/1982 | Moore et al. | 523/206 |
| 4,341,877 | 7/1982 | Das et al. | 423/409 |
| 4,370,439 | 1/1983 | Melle et al. | 524/513 |

FOREIGN PATENT DOCUMENTS

| | | |
|---|---|---|
| 1046870 | 1/1979 | Canada ............... 117/198 |
| 683 | 2/1979 | European Pat. Off. .......... 65/3.44 |
| 1221639 | 2/1971 | United Kingdom . |
| 1278777 | 6/1972 | United Kingdom . |
| 1503926 | 3/1978 | United Kingdom . |
| 1571099 | 7/1980 | United Kingdom . |
| 1590409 | 6/1981 | United Kingdom . |

*Primary Examiner*—Lorraine T. Kendell
*Attorney, Agent, or Firm*—Kenneth J. Stachel

[57] ABSTRACT

An aqueous sizing composition, method of preparing same and sized glass fibers are provided that enables the production of sized glass fibers having improved filamentization. When these sized glass fibers are used for reinforcing polymeric materials the polymeric materials have good filamentization resulting in reinforced polymeric materials having good mechanical properties such as tensile strength and compaction without detrimentally affecting fuzz, fly or static properties of the strands. The sizing composition and method of producing same and sized glass fiber strand and reinforced polymeric materials and other improvements of the present invention eminate from the use of an interaction product of an epoxidized polar thermoplastic copolymer and an amino organo silane coupling agent in an aqueous sizing composition that also contains a predominant amount of a cross-linkable film former.

The aqueous sizing composition has one or more cross-linkable film formers, one or more organo silane coupling agents and about 2 to about 12 weight percent of an interaction product of an unhydrolyzed or partially hydrolyzed amino organo silane coupling agent and an epoxidized polar thermoplastic copolymer. The epoxy copolymer has about 2 to about 12 parts of monomer with epoxy functionality per 100 parts of copolymer. Also the epoxy copolymer has a glass transition temperature (Tg) of from $-10°$ C. to about $70°$ C. The unhydrolyzed or partially hydrolyzed amino silane coupling agent is contacted with the epoxidized copolymer, where the copolymer has a percent solids in the range of about 15 to about 60 weight percent.

The sizing composition can also have additional additives like lubricants, plasticizers, emulsifiers, urea formaldehyde condensates and the like.

The method of producing the aqueous sizing composition involves having at least one organo silane coupling agent which is an amino organo silane coupling agent which is split for addition so that a predominant amount in an unhydrolyzed or partially hydrolyzed form is added to the cross-linkable film former and the remaining amount of the unhydrolyzed or partially hydrolyzed amino organo silane coupling agent is added to the epoxidized copolymer.

The aqueous sizing composition is applied to glass fibers during their formation, and the sized glass fibers are gathered into strands and dried at a temperature of above $100°$ C. for about 4 hours. A plurality of the dried, sized glass fiber strands are gathered dried and collected for use in various forms such as chopped strands, continuous strands, mats and the like for reinforcing polymeric materials.

21 Claims, No Drawings

AQUEOUS SIZING COMPOSITION AND SIZED GLASS FIBERS AND METHOD

This is a division of application Ser. No. 273,791, filed June 15, 1981 now U.S. Pat. No. 4,338,233.

The present invention is directed to an aqueous composition for treating glass fibers, method of forming the aqueous composition, and sized glass fibers that are treated with the aqueous sizing composition and that have the dried residue of the aqueous sizing composition. More particularly, the present invention is directed to an aqueous sizing composition and method of forming same that enables the production of sized glass fiber strands having good wettability and having improved compaction and tensile strength when formed into a mat and composite while having a low amount of fly and static.

In producing glass fiber strands, a multitude of glass fibers are drawn at a high rate of speed from molten cones of glass at the tips of small orifices in a bushing in a glass batch melting furnace. While the fibers are being drawn and before they are gathered into a strand or strands, they are treated with an aqueous sizing composition. The sizing composition must protect the glass fibers from interfilament abrasion and allow the glass fibers to be compatible with the materials they are to reinforce. Typically, the aqueous sizing composition has a binder to give strand integrity and workability, a lubricant to prevent damage to the strands by abrasion, and a coupling agent.

Sized glass fibers in the form of one or more strands, both continous and chopped, and in the form of mat and roving, which is a plurality of strands in one group, have found utility in the area of reinforcing polymer matrices. It is desired when glass fibers are used in the various forms in polymer reinforcement that the glass fiber strand or roving have certain performance characteristics. One characteristic is that the sized glass strands should be capable of becoming disassociated from each other during chopping of the strands or roving, so that the strands may uniformly disperse throughout the polymeric material. Another characteristic is that the glass fiber strand products should not generate too much fly or static during processing even though they will separate into monofilaments i.e. filamentize after exposure to polymer matrices for a sufficient period of time.

Another important aspect of producing sized glass fiber strand products is the processability of the fibers and strands during their manufacture. One problem associated with the forming of sized glass fibers is the migration of the binder and sizing composition, when the fibers are dried after formation. This problem arises when the strand or strands, having been wound onto a forming package, are subsequently dried in an oven and if desired, under reduced pressure. During this drying process, the solids of the sizing composition have a tendency to migrate from the inside of the package to the outside of the package. This migration causes nonuniformity of the performance of the strands and roving and therefore, it is desirable to have a sizing composition, which is nonmigratory and produces a uniform distribution of sizing composition on the strands throughout the forming package.

Such a reduced migration sizing composition was discovered and is disclosed in U.S. Pat. No. 4,029,623 (Maaghul). This sizing composition utilizes a water solubilized, condensation, cross-linkable, first unsaturated polyester resin; a second, unsaturated, water dispersible, and insoluble polyester resin being insoluble in the first polyester resin in a water solution; a plasticizer; a first silane coupling agent to promote adhesion between the glass fibers and the resin matrix; a second silane coupling agent to control the wetting of said glass fibers by said first silane coupling agent and a thermoplastic polymer to impart pressure sensitive adhesive characteristics.

Sized glass fibers in the form of strand, mat and especially chopped glass fiber strands and chopped glass fiber strand roving, are useful in the preparation of reinforced polymeric materials such as sheet molding compound, bulk molding compound, and thick molding compound. In the production of these compounds, the chopped glass fiber strands must properly contact the polymeric matrix material. This contact is a function of the wettability of the sized glass fiber strand. One measure of the contact is referred to as "wet-out", which means flowability of the polymer matrix material through the glass fiber strand mass to obtain near complete encapsulation of the entire surface of each glass fiber strand in the compound. Another measure of this proper contact is referred to as wet-through or flow-through. This refers to the speed with which the matrix polymer can flow through into the mass of glass strands when compounding the molding compound. It is also desirable when producing molding compounds like sheet molding compounds to have a high degree of wet-through and resin penetration into the strand or into a substrand bundle of fibers.

In producing composites from the molding compounds, the obtainment of uniform-low ripple and smooth surfaces for the molded composites is influenced by the solubility of the sizing composition present with the glass fiber strands in the polymer compound. Molding compounds, having sized glass fibers, where the sizing composition is substantially insoluble in the polymer, causes the majority of sized glass fibers to remain intact in a strand rather than filamentizing into their component fibers in the polymer matrix. This integrity of the strand is desirable to maintain the strand form through the multitude of forces and conditions the glass fiber strands experience during the preparation of the molding compounds. The ability of the strand to maintain its integrity through the process of preparation of the compounds guards against filamentization and the consequent formation of fuzz balls and the resultant loss in surface characteristics of the molded composite. At some point in the process of preparing the molding compounds, the sized glass fiber strands are fed into the compounding machinery. Usually, the sized glass fiber strands are fed into the machinery as roving and are subsequently chopped to contact the polymer. After the glass fibers are in contact with the polymer material in the molding compound, the wettability of the sized glass fibers should enable the strands to filamentize into their component fibers to produce molded composites with increased strength.

It has recently been discovered that a sizing composition useful in giving good wettability, when desired, but also giving good integrity for processing is comprised of a major amount of one or more cross-linkable film forming polymers compatible with the polymer matrix of the molding compound, one or more organo silane coupling agents and an expoxidized polar thermoplastic copolymer in an amount of about 10 weight percent to about 50 weight percent of the solids in the sizing composition and an amount of water sufficient to make the percent solids of the sizing composition in the range of about 2 to about 30 weight percent. This sizing composition is more fully disclosed in U.S. patent application Ser. No. 156,460 filed June 4, 1980, now U.S. Pat. No. 4,338,234 by Moore and Das and assigned to the same assignee as the present application. It has also been found that this sizing composition can be slightly modified to perform as a reduced migrating size similar to the size of U.S. Pat. No. 4,029,623 (Maaghul) by using the epoxidized polar thermoplastic copolymer as the thermoplastic polymer in the sizing disclosed in U.S. Pat. No. 4,029,623.

It has been observed that the sizing composition as taught in U.S. patent application Ser. No. 156,460 filed June 4, 1980, produces sized glass fiber strand that when used with molding compounds could be improved further in two areas. The improvements that are needed are that of improved tensile strength and improved compaction of a mat of continuous or chopped glass fiber strands in a polymeric matrix. These improvements are needed, but not at the cost of reducing properties already achieved such as low fuzz, fly and low static generation.

It is an object of the present invention to provide an aqueous sizing composition that when used to produce sized glass fiber strand for producing molding compounds to make molded composites results in improved tensile strength and compaction in the reinforced molding compound.

It is a further object of the present invention to provide the sized glass fiber strands that when used in molding compounds to make molded composites lead to improved compaction of the glass fibers in a mat used to produce a composite and improved tensile strength of the composite without sacrificing the good fuzz, fly and reduced static properties of the strand during processing.

It is another further object of the present invention to provide a method of making the aqueous sizing composition that is used in producing the sized glass fiber strands that results in improved compaction when used in a mat form with molding compounds and improved tensile strength of the molded composite.

It is another additional object of the present invention to provide an interaction product of a silane coupling agent and a thermoplastic film former for use in an aqueous sizing composition for treating glass fibers, where the size leads to improved uniformity of the coating of the sizing composition on the glass fibers when they are dried.

SUMMARY OF THE INVENTION

The foregoing object and other objects inherent from the following disclosure are accomplished by the aqueous sizing composition, method of making same, and sized glass fibers of the present invention.

The invention in its broadest aspects comprises an aqueous sizing composition for glass fibers that has one or more cross-linkable film forming polymers and an interaction product of an epoxidized polar thermoplastic copolymer with a glass transition temperature (Tg) from around $-10°$ C. to $70°$ C. with an unhydrolyzed and/or partially hydrolyzed amino-containing silane coupling agent along with any other additives normally used in the course of preparing sized glass fiber strands. The copolymer has about 2 to about 12 parts of the monomer having epoxy functionality per 100 parts of copolymer, the monomers for producing the copolymer are selected from more than one of the following monomers: -olefinic monomers; vinyl acetate; acrylate; polyurethane condensate repeating unit having the characteristic urethane linkage,

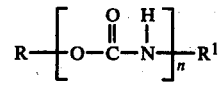

where, R and $R^1$ are the same or different organic groups including low molecular weight polymers capable of use in producing polyurethanes, polyester condensate repeating unit having the formula

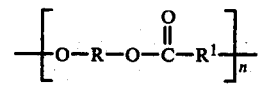

where, R and $R^1$ are the same or different orgranic groups capable of use in producing polyester. One of any of these monomers can have the epoxy functionality when combined with one of the monomers that does not have epoxy functionality. The epoxy functionality includes 1,2 groups such as an oxirane ring compound. The epoxidized polar thermoplastic copolymer can have a glass transition temperature (Tg) as determined by any method known in the art, for example, nuclear magnetic response peak ratio, in the range of about $-10°$ C. to about $70°$ C.

The unhydrolyzed and/or partially hydrolyzed amino-containing silane coupling agent can be any amino-containing silane coupling agent known by those skilled in the art to be useful in producing sized glass fiber strands for reinforcement purposes, wherein the silane is unhydrolyzed and/or partially hydrolyzed. The amino-containing organo silane coupling agent is in the unhydrolyzed or partially hydrolyzed form when it is combined with the epoxidized polar thermoplastic copolymer.

The one or more cross-linkable film forming polymers are present in the aqueous sizing composition as the predominant amount of the solids of the sizing composition. The one or more cross-linkable film forming polymers are any suitable film forming polymer capable of cross-linking and that makes the sizing composition substantially insoluble in, but compatible with a matrix polymer that the sized glass fiber strands are to reinforce.

A method of preparing the aqueous sizing composition is also provided wherein the unhydrolyzed and/or partially hydrolyzed amino-containing silane coupling agent used in an amount of about 0.1 to about 2.5 weight percent of the aqueous sizing composition is added in a split addition. A portion of the unhydrolyzed or partially hydrolyzed amino-containing silane is added to the one or more cross-linkable film forming polymers, as one addition, and another portion is added to the expoxidized polar thermoplastic copolymer as the other addition to produce the interaction product with the epoxy thermoplastic copolymer. Since the one or more cross-linkable film forming polymers is or are used in a predominant amount of the solids of the sizing composition, a predominant amount of the unhydrolyzed or partially hydrolyzed amino-containing organo silane coupling agent is added to this polymer, while the minor amount of the unhydrolyzed or partially hydrolyzed amino-containing organo silane coupling agent is combined with the epoxidized polar thermoplastic copolymer.

The aqueous sizing composition produced in accordance with the method of the present invention can be applied to glass fibers by any conventional method to produce strands of sized glass fibers. The strands can be dried at lower temperatures without the production of excessive fuzzing to produce sized glass fibers having the dried residue of the aqueous sizing composition of the present invention. These dried sized glass fiber strands can be used for polymer reinforcement with molding compounds such as sheet molding compounds (SMC) bulk molding compounds (BMC) and thick molding compounds (TMC), and with thermoplastic polymers.

The aqueous sizing composition is applied to the glass fibers by any process and apparatus known to those skilled in the art. The sized glass fibers are gathered into one or more glass fiber strands and wound into a package of glass fiber strand or strands on a forming tube. This package is then dried at conditions known to those skilled in the art to produce glass fiber strands having the dried residue of the sizing composition. The aqueous sizing composition of the present invention enables the sized glass fiber strands to be dried at a lower temperature without producing excessive fuzzing that might originally be produced by conventional drying temperatures. A plurality of the glass fiber strands having the dried residue of the sizing composition are gathered together to form a roving package of numerous glass fiber strands or are used as forming packages for supplying glass fiber strands for polymeric reinforcement. With formation of the roving package, or with the use of forming packages, one or a plurality of the packages are heated in a temperature above about 212° F. (100° C.). For a roving package, this heating can also be performed during formation of the roving before or after the plurality of glass fiber strands are gathered together. The roving or forming packages having been heated and having glass fiber strands with the dried residue of the sizing composition can be used in the form of continuous glass fiber strands, chopped strands woven glass fiber strand mat for reinforcing polymeric materials such as thermoplastic polymers, polyester resins and vinyl esters.

DETAILED DESCRIPTION OF THE INVENTION

In the production of glass fiber strands, the fibers attenuated from the orifices in a bushing can be produced into one or more strands or sets of substrands. This production involves gathering the fibers into more than one strand, or sometimes referred to as splitting the strand into sets of substrands. This splitting technique enables the larger diameter glass fibers to be manufactured into strands or substrands that can be produced into rovings and chopped and/or continuous and/or swirl, glass fiber strand mat and composites of polymers reinforced with such mats having competitive physical properties with fine glass fiber strand products having many filaments per strand. Without the splitting technique, the glass fiber strand mats and composites made with strands having coarser fibers in the strands would have inferior properties to mats produced with fiber strands composed of fine filaments in the strand. A larger number of splits, i.e., a larger number of substrands, produced with fewer fibers will result in mats having better physical properties. For example, a three-way split strand, i.e., production of three sets of substrands as opposed to a two-way split should lead to the production of mats and composites having better tensile strength.

It is believed without limiting the present invention, that not all of the physical properties of glass fiber strand mats or a composite of polymer reinforced with such mats are improved by a greater number of splits in the production of glass fiber strands. For example, chopped glass fiber strands of the present invention having a lower split, i.e., having more fibers per strand can be produced into composites reinforced with mats, where the composite has approximately the same tensile strength as composites produced from strands having high splits or fewer fibers per strand. The chopped glass fiber strands of the present invention have the dried residue of the aforedescribed and afterdescribed inventive aqueous sizing composition. Remarkably, this tensile strength improvement for lower split strands is achieved without sacrificing other physical properties of the strand or subsequently produced mats or composites. These other physical properties include the reduced amount of fuzz, fly and static generation for the treated strands and improved compaction of the composite or compound reinforced with chopped glass fiber strand mat made from the treated glass fiber strands.

It is believed but the process of the present invention is not limited by this belief, that the sized glass fiber strands having the dried residue of the aqueous sizing composition of the present invention promotes increased strength particularly, tensile strength and improve compaction when used in chopped or continuous strand mat reinforcement of polymers for two reasons. The first reason is the more uniform distribution of the sizing on the glass fiber surface brought about by the interaction product of the film formers with the unhydrolyzed and/or partially hydrolyzed amino-containing organo silane coupling agent. This more uniform distribution of the sizing composition having a film former that is soluble is the matrix polymer and uniformly distributed over the glass fiber surface improves wetting and filamentization of the glass fiber strands by the polymer matrix, and into the glass fibers, respectively. This wetting and filamentization contributes to such mechanical properties as tensile strength of the polymer reinforced with the treated glass fiber strands i.e., the composite. In addition, a more uniform distribution of the sizing composition on the surface of the glass fibers and strands enables reduction of the drying temperature or time for producing dried sized glass fiber strands. This lower drying temperature of the strands also facilitates better wet-ting and filamentization of the strands and increases the compaction of the molding compounds made with the strand without increasing to any great degree the production of excessive fuzz or fly of the strands. The second reason is the total or partial solubility of the size on the sized glass strands in polymer matrices that are used in producing glass-containing compounds like sheet molding compounds and the like. This type of solubility usually occurs after the sized glass fiber strands and polymer matrix are in contact with each other for a period of time. This solubility allows penetration of the matrix polymer into the strand and this promotes intimate contact of the matrix polymer with the filaments. With the intimate contact, the strength of many and possibly of each filament can be utilized.

Before describing the preferred embodiment of the present invention, a general description of the composition, size glass fiber strands, bundle of sized glass fiber strands, and glass fiber reinforced polymeric materials in their broadest aspects are given below.

In the present invention, the amino-containing organo coupling agent is unhydrolyzed or partially hydrolyzed. The meaning of these terms is clear from the general formula for an organo silane with its two classes of functionality:

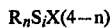

$$R_nS_iX(4-n)$$

X is a hydrolyzable group typically an alkoxy group or halogen, or acyloxy or amine. Following hydrolysis a reactive silanol group is formed where the X is three OH groups. The silanol group can condense with other silanol groups to form siloxane linkages. The hydrolysis of the silane to produce intermediate silanols proceeds by the reaction $YRSiX_3+3H_2O$ $YRSi(OH_3)+3HX$ where the R is a organo functionality and Y is one of the functional groups of methacryloxy (glycidoxy) vinyl, and chloro or amine. Generally, when the Y group leads to a neutral organo functional silane coupling agent, the silane is prepared in dilute acetic acid to promote rapid hydrolysis to the silane triols, which then condense slowly to the oligomeric siloxanols. When the Y group is an amino functionality, making it an amino organo functional silane coupling agent, these silanes hydrolyze almost immediately in water. The presence of the amine can cause immediate precipitation of alkyl silanols as insoluble siloxanes in the presence of water. The unhydrolyzed or partially hydrolyzed silane with the amino organo functionality is where the silane does not contain the full complement of hydroxyl groups attached to the silicon atom but contains the X groups such as alkoxy and the other aforementioned X groups. In the partially hydrolyzed state, it is meant that the silane has been contacted with water to the extent that no more than 2 hydroxyl groups are attached to the silicon atom of the silane, and the silane monomer with at least one alkoxy group is the predominant siliane form. The alkoxy radicals that can be attached to the silicon atom are those having 2 to 5 carbon atoms. The unhydrolyzed or partially hydrolyzed amino-organo functional silane may be a mixture of amino functional silanes that are unhydrolyzed or contain less than 3 hydroxi groups attached to the silicon atom, but the predominant form of the silane is the monomer comprised of silane, monosilanol or disilanol.

The amino-containing organo silane coupling agent that can be used in producing the interaction product between the silane and the epoxidized polar thermoplastic copolymer can be any suitable amino organo silane known to those skilled in the art for use as a coupling agent with glass fibers. Nonexclusive examples of these amino-containing organo silane coupling agents include:

aminomethyltrimethoxysilane
gamma-aminopropyltrimethoxysilane
gamma-methylaminopropyltrimethoxysilane
gamma-ethylaminopropyltrimethoxysilane
gamma-N, N-dimethylaminopropyltrimethoxysilane
gamma-aminopropyltriethoxysilane
gamma-aminopropyltripropoxysilane
gamma-aminopropylmethyldiethoxysilane
gamma-aminopropylethyldiethoxysilane
gamma-aminopropylphenyldiethoxysilane
gamma-aminoisobutyltrimethoxysilane
delta-aminobutyltriethoxysilane
delta-aminobutylmethyldiethoxysilane
beta-aminoethyltriethoxysilane
epsilon-aminopentylphenyldibutoxysilane
N-(beta-aminoethyl)-gamma-aminopropyltrimethoxysilane
N-(beta-dimethylaminoethyl)-gamma-aminopropyltrimethoxysilane
N-(beta-aminoethylaminoethyl)-gamma-amino-propyltrimethoxysilane
N-(gamma-aminopropyl)-gamma-aminoisobutylemethydiethoxysilane
N-(beta-aminoethyl)-gamma-aminopropyltriethoxysilane
1,4-aminophenyltrimethoxysilane In preparing the interaction product, the epoxidized polar thermoplastic copolymer can be epoxidized polyvinylacetate copolymer, epoxidized polyacrylate copolymer including various acrylates, which are esters of acrylic or methacrylic acid, like methyl methacrylates, methyl acrylate, ethyl metacrylate, 2-ethylhexyl acrylate, butylacrylate and the like; epoxidized saturated polyester copolymers; and epoxidized polyurethane copolymers, like thermoplastic aliphatic and aromatic polyurethanes prepared from condensation polymerization of an aliphatic or armotic diisocyanate and diol, and epoxidized olefinic copolymers such as epoxidized ethylene vinyl acetate and ethylene ethyl acrylate copolymers. The copolymer can be formed by emulsion or suspension polymerization or other polymerization processes known in the art and may contain small amounts of various polymerization additives like stabilizers and surfactants.

The copolymers exist in aqueous emulsions having varying amounts of solids. In the copolymer the amount of the monomer having the epoxy functionality is in the range of about 2 to about 12 parts per 100 parts of the copolymer. If there are less than two parts, the copolymer will not be sticky enough to give good ribbonization. Amounts greater than 12 parts of the monomer having epoxy functionality may lead to too much tackiness for processing.

Generally, the interaction product is present always as a minor constituent of the sizing composition compared to the amount of cross-linkable film formers present such as an amount of about 10 to about 50 weight percent of the solids of the sizing composition. This amount is important in order to get improved wet-out of the sized glass fiber strands. The amount is also necessary to obtain improved cleanability when the size contains a water solubilized cross-linkable film former that dries to a relatively water insoluble material. The amount is necessary in this case since it reduces the amount of the water solubilized, cross-linkable film former present in the composition per a given solids content of the composition. This makes the dried sizing composition less intractable to cleaning from equipment surfaces.

The epoxy-containing monomer has around one oxirane ring per monomeric repeating unit. Also a smaller amount of oxirane rings can be present such as when not all the monomer to be epoxidized is epoxidized with one oxirane ring per monomeric repeating unit. Also, a larger amount of oxirane rings may be present such as when some monomeric repeating units have more than one oxirane ring. In both cases the predominant amount of monomeric repeating units have one oxirane ring per monomeric repeating unit. An example of the epoxidation of a monomer is the use of glycidol methacrylate as the monomer. The monomer may be epoxidized by any method known to those skilled in the art.

The epoxidized polar thermoplastic copolymer is a copolymer selected from the aforementioned materials, where the other comonomer for forming the copolymer is any of the monomers of the other materials mentioned. For example, the epoxidized polyvinylacetate copolymer can have as the comonomer in forming the copolymer the acrylates, saturated polyester repeating units, e.g. HO—(O—CROCO—O—R) OH, saturated polyurethane repeating units, e.g., (O—CO—NH), and alkylene monomers like ethylene, propylene and the like. In preparing the epoxidized polar thermoplastic copolymer, it is preferred to have one type of comonomers epoxidized before reaction with the other comonomer, although the copolymer after formation may also be epoxidized so that about 2 to about 12 percent of the copolymer is epoxidized.

Suitable epoxidized polar thermoplastic copolymers include the product designated "25-1971" available from National Starch, Bridgewater, N.J., which is an epoxidized polyvinylacetate copolymer. This copolymer is a copolymer of glycidol methacrylate and vinyl acetate, the copolymer contains about 2 parts of the glycidol methacrylate per 100 parts of vinyl acetate. In its preferred form, the copolymer will be employed in the form of a 53 percent solids emulsion, the copolymer having an average particle size within the range of about 0.2 to about 3 microns. Another example is an epoxidized polyvinyl acetate copolymer available from National Starch under the trade designation "Resyn N S R-3362-53". And another epoxidized polyvinylacetate that is useful is that available from H. B. Fuller Company under the trade designation "P N-3013".

Also, an epoxidized polyester urethane copolymer can be used, where an epoxidized saturated polyester having two or more functional hydroxyl groups is added to aromatic isocyanates with two or more functional groups of isocyanate at temperatures of around 100°–200° C. The polyester or polyurethane comonomer can be epoxidized by any method known to those skilled in the art. Also, the epoxidized copolymer is emulsified in water by any method known to those skilled in the art.

All of the epoxidized copolymers have a glass transition temperature in the range of about −10° C. to about 70° C. as determined by any suitable method such as by nuclear magnetic resonance peak ratio or by approximation techniques like differential thermal analysis.

In producing the interaction product between the epoxidized polar thermoplastic copolymer and the amino-containing organo silane coupling agent, the amino silane coupling agent is added to the epoxidized polar thermoplastic copolymer where the copolymer is in an aqueous solution and the amino silane is in an unhydrolyzed or partially hydrolyzed form. The epoxidized thermoplastic copolymer should have a solids content in the aqueous solution of at least about 15 weight percent to preclude over hydrolysis of the amino silane, thereby favoring the reaction between silanols to form siloxane rather than the reaction of the amine group of the silane with the epoxy group of the epoxidized polar thermoplastic copolymer. The amount in this portion of the amino silane coupling agent added to the copolymer is in the range of about 1 weight percent of about 50 weight percent of the total amino-silane used in the aqueous sizing composition. The total amount of the amino silane in the aqueous size varies from about 0.1 to about 2 weight percent of the aqueous size. It is believed but the present invention is not limited by this belief that the reaction between the amine in the organo group of the silane coupling agent and the epoxy group of the thermoplastic copolymer is an acid base salt formation type of reaction.

The sizing composition in which interaction product of the epoxidized polar thermoplastic copolymer and amino-containing organo silane coupling agent can be used is one that has one or more cross-linkable film formers. Nonexclusive examples of the cross-linkable film formers include: additional polymers and copolymers and interpolymers with unsaturation capable of crosslinking in the presence of free radicals, like polyvinyl acetate and acrylic polymers, or copolymers like vinyl acetate-N-metholacrylamide, and condensation polymers, copolymers and interpolymers having unsaturation or having terminal and/or pendant functional groups capable of cross-linking with nitrogenous compounds or monomers, for example, polyesters, epoxies and polyurethanes.

The sizing composition has an amount of one or more cross-linkable film formers sufficient to make the sizing composition in the dried state substantially insoluble in the matrix polymer. The substantial insolubility is less than 50 percent solubility and preferably about 1 to about 35 percent soluble. The cross-linkable film formers may be water solubilizable or water dispersible for use in the aqueous sizing composition. If the cross-linkable film former is water solubilizable, the curing time and degree of curing can be adjusted by selection of nitrogenous base compounds to solubilize the polymer. If the nitrogenous base is a volatile material, the resulting dried sizing composition is easily cleaned from surfaces surrounding the operation, where the sizing composition is applied to the glass fibers during their formation.

In addition to the one or more cross-linkable film formers, the sizing composition may contain coupling agents, lubricants, plasticizers, surfactants, non-cross-linkable film formers, film former modifiers and the like. Any of these materials known to those skilled in the art may be used.

When the sizing composition contains a water solubilized cross-linkable, unsaturated polyester resin, a water dispersible unsaturated polyester resin, a plasticizer, one or more silane coupling agents, a polyvinyl acetate acrylic thermoplastic polymer has been used in an amount of about 1 to about 6 weight percent. In such a sizing composition, the interaction product of the amino-containing organo silane coupling agent, and the epoxidized polar thermoplastic copolymer in an amount of about 2 to about 12 weight percent of the sizing composition is substituted for the polyvinylacetate acrylic thermoplastic copolymer. In this substitution the amount of interaction product is higher than the amount of polyvinylacetate acrylic copolymer. Preferably, if the sizing composition had 1 weight percent of the vinylacetate acrylic copolymer, then three times that amount or 3 weight percent of the interaction product is used.

The description of the meanings of terms "water soluble resin", "water dispersible resin", and "substantially insoluble", along with the description of the water-solubilized polyester resin, the water dispersible polyester resin, plasticizer, and coupling agents can be gleaned from U.S. Pat. No. 4,029,623 (Maaghul), which is hereby incorporated by reference.

In general, the amounts of the polyester resins, plasticizer, and silane coupling agent system are similar to those described in U.S. Pat. No. 4,029,623 calculated in percent by weight of either nonaqueous solids or aqueous sizing composition and herein incorporated by reference. For example, the amount of the one or more silane coupling agents can be from about 0.1 to about 5 percent by weight based on the total aqueous sizing composition for each coupling agent, or up to 20 weight percent based on the non-aqueous components of the sizing composition for the one or more coupling agents. An exception is that in using the amount of the interaction product of the amino-containing organo silane coupling agent and the epoxidized polar thermoplastic copolymer in the range of 2 weight percent to about 12 weight percent of the composition in producing a total solids content within the range of 2 percent to 30 percent by weight, the amount of the other ingredients in the composition will decrease. This decreases the amount of water solubilizable polyester, thereby making the dried sizing composition easier to clean from equipment surfaces.

Particular additional additives that can be added to the sizing composition include such additives as flexibilizing agents, film former modifiers, wetting agents, stabilizers and curing agents. One particular useful additive that is added to the composition is a urea formaldehyde condensate such as that available from Monsanto Chemical Company under the trade designation "Resimene 970", which is used in an amount in the range of about 0.05 to about 3 weight percent of the aqueous sizing composition. Another helpful additive that is added is an emulsifier that is used to produce an emulsion of the amino-silane coupling agent and the polyester resin that is water dispersible. A particular useful emulsifying agent is that commercially available under the trade designation "Abex 18 S", which is an anionic emulsifier having a solids content of 35±1.70 and a pH of 7.5 to 8.5 at 25° C., and which is sold by Alcolar Chemical Corporation.

The plasticizer, which is preferably incorporated into the emulsion of the silane and the water dispersible polyester resin, can be incorporated into the sizing composition in an amount necessary to give an amount in the aqueous sizing composition of about 2 percent to about 12 percent or by weight based on the total aqueous size composition. A particularly advantageous plasticizer is tricresyl phosphate. Other plasticizers known to those skilled in the art may be utilized so long as they impart the necessary properties of flexibility and processability to the glass fiber strand and roving formed therefrom and to aid in the coalescense of the solids in the sizing composition. Typical of other plasticizers are dioctyl phthalate, dibutyl phthalate, ethyl ortho-benzol benzoate, trixylenol phosphate and the like.

In addition, any emulsifying agent known to those skilled in the art can be used, such as anionic, cationic or nonionic emulsifying agents. These types of emulsfying agents are known to those skilled in the art of preparing and using sizing compositions for glass fibers. Generally, the amount of all the additives, including the emulsifiers that are well known to those skilled in the art, falls within the range of about 1 weight percent to about 17 weight percent of the total solids content of the sizing composition although higher amounts can be used.

The sizing composition of the present invention can be prepared by the method disclosed in U.S. Pat. No. 4,029,623 (Maaghul) and/or U.S. patent application Ser. No. 156,460 field June 4, 1980 by the same inventors as this application and having a common assignee, both of these being incorporated by reference into this application. The exception to the methods of the patent or the patent application is that the interaction product between the epoxidized polar thermoplastic copolymer and amino-containing organo silane coupling agent is added to the sizing formulation instead of the vinylacetate acrylic thermoplastic copolymer of the patent or the epoxidized polar thermoplastic copolymer of the patent application.

The preferred and novel method of producing an aqueous sizing composition including the interaction product is the use of a split addition of the amino-containing organo silane coupling agent. In the method of the patent application, there is disclosed the use of the amino-silane coupling agent in its unhydrolyzed or partially hydrolyzed form being added to the film former such as the saturated or unsaturated polyester resin to favor the reaction of the amine with the free carboxyl groups of the resin. In preparing a sizing composition having the interaction product along with the major amount of cross-linkable film forming polymer, or an additional film forming polymer, a new method has been devised for such production. The new method involves using an amount of the amino-containing organo silane coupling agent in an amount of about 0.1 to about 2.5 weight percent of the aqueous sizing composition to be prepared. This amino silane coupling agent is used in its unhydrolyzed or partially hydrolyzed form and its addition to the sizing composition is a split addition having a predominant amount of the coupling agent added to the cross-linkable film forming polymer or additional film forming polymer and having a minor amount of the 0.1 to 2 weight percent of the amino silane coupling agent added to the epoxidized polar thermoplastic copolymer. This split addition forms an interaction product between the amino silane coupling agent and the saturated or unsaturated polymer film former used in a predominant amount in the size and also an interaction product between the amino silane coupling agent and the epoxidized polar thermoplastic copolymer. The other ingredients for the sizing composition are added as is disclosed in the U.S. Pat. No. 4,029,623 or the patent application hereby incorporated by reference.

The method of applying the sizing composition to glass fibers and forming sized glass fibers and forming a roving of the sized glass fiber strands is the same as that disclosed in the aforereferenced U.S. Patent and patent application. This method involves a drying step after the sized glass fibers are gathered into strands and wound onto a forming package. This drying occurs in an oven at a temperature above about 100° C. for longer than 1 hour, preferably 133° C. for 11 hours to produce the sized glass fiber strands having the dried residue of the sizing composition. With the use of the aqueous sizing composition of the present invention, the drying temperature is preferably around 120° to 127° C. and generally not more than 135° C. The method of using the roving packages of sized glass fiber strands with molding compounds is the same as that disclosed in the aforereferenced patent application.

DESCRIPTION OF THE PREFERRED EMBODIMENT

In the preferred embodiment of the present invention, the cross-linkable film forming polymer used in a predominant amount is a combination of a water soluble polyester resin having pendant and terminal carboxyl functionality and a water dispersible polyester resin. The amount of the water soluble polyester resin with free carboxyl functionality is less than the amount of the water dispersible polyester resin, and the combined amount of these materials constitutes a predominant amount of the solids of the aqueous sizing composition. It is also preferred that the water solubilizable polyester resin is resin A of U.S. Pat. No. 4,029,623 (Maaghul) and the water dispersible polyester resin is resin B of the U.S. Pat. No. 4,029,623. Also, it is preferred to have a sizing composition having a higher solids content in a range of about 18 to about 25 weight percent. Generally, the solids content of the sizing composition of the present invention can range from about 2 to about 30 weight percent. Also it is preferred in preparing a sizing composition that the amino-containing organo silane coupling agent is its unhydrolyzed form when a predominant amount of the 0.1 to 2 weight percent of the silane is added to the water dispersible polyester resin, resin B, having terminal carboxyl functionality. Also, it is preferred that the epoxidized polar thermoplastic copolymer to which the amino-containing organo silane coupling agent is added to form the interaction product is epoxidized polyvinylacetate acrylic copolymer. It is preferred that the amino silane is in its unhydrolyzed form when added to the epoxidized copolymer. Also it is preferred to add about 0.5 to about 3 weight percent of the urea formaldehyde condensate resin to the aqueous sizing composition. Also, the preferred amino-containing organo silane coupling agent is the gamma-aminopropyltrimethoxysilane available from Union Carbide Corporation under the trade designation "A-1100". Therefore, the preferred sizing composition of the present invention comprises:

about 1 to about 12 weight percent of water solubilizable unsaturated polyester resin;

about 2 to about 12 percent by weight of water dispersible unsaturated polyester resin, wherein the amount of water dispersible polyester resin is greater than the amount of water solubilizable polyester resin;

about 2 to about 12 percent by weight of a plasticizer;

about 0.1 to about 2.0 percent by weight of an unhydrolyzed amino-silane coupling agent, which is combined with the water dispersible polyester resin in preparing the sizing composition;

about 0.1 to about 2.0 percent by weight of a second silane coupling agent;

about 0.5 to about 3 weight percent of urea formaldehyde condensate resin;

2 to about 12 weight percent of an interaction product of epoxidized polyvinylacetate-acrylate copolymer and unhydrolyzed amino-silane coupling agent, and a minimum of 70 percent by weight of water. These same amounts can be used for any broader class of a similar component for the sizing composition.

The preferred method of preparing the aqueous sizing composition involves the following procedure. A silane coupling agent having unsaturation particularly the gamma-methacryloxypropyltrimethoxysilane (available as A-174 from Union Carbide Corporation) is combined with acetic acid and held in a premix vessel. In another premix vessel, the epoxidized polyvinylacetate acrylic copolymer with 53 percent solids is combined with water to dilute the polymer to around 25 to 30 weight percent solids particularly 28 to 29 weight percent solids and the unhydrolyzed gamma-aminopropyltriethoxysilane (available as A-1100 from Union Carbide Corporation) is slowly added with agitation. The amount of the amino silane added to the resin is preferably in the range of about 1 to about 50 weight percent of the total amino silane added to the sizing composition, which is in the range of about 0.1 to about 2 weight percent of the aqueous sizing composition. The emulsifier and the plasticizer are added to water in a separate premix vessel.

In a high shear premix vessel, the predominant amount of the amino silane in unhydrolyzed form is added to the polyester resin film former which is an unsaturated polyester resin, i.e., resin B. The amount of amino silane added is from around 50 to 99 weight percent of the A1100 to be added to the aqueous sizing composition. In this premix vessel having the polyester resin and amino silane, a high shear agitator slowly agitates the mixture and the temperature should not exceed around 50° C. The emulsifier and plasticizer mixture is added from one of the other premix vessels to the polyester amino silane mixture in 25 percent aliquots of the total emulsifier and plasticizer mixture with homogenous mixing between each addition until the total amount is added. The resulting mixture is diluted with deionized water, which is preferably used for all the water used in preparing the size, and agitation is continued for around 10 minutes. The resulting mixture is added to a main mix tank.

The second polyester resin having free carboxyl groups, i.e., is diluted and added to the main mix tank. The hydrolyzed silane A-174 previously mixed with water, is added to the main mix tank. The urea formaldehyde condensate available as Resimene 970 is dissolved and added to the main mix tank. The interaction product of the epoxidized polyvinylacetate acrylic copolymer and the amino silane prepared in a premix tank is added to the main mix tank. In addition, the defoaming agent available as SAG 470 is added to the mix tank. The mixture is then agitated for a period of time of around 1 hour before using.

The sizing composition is preferably applied to glass fibers that are gathered into strands on forming packages and then dried at around above 100° C. but not more than around 135° C. and preferably around 115° to about 127° C., and most preferably 120° C. to 127° C., for around 4 hours. A plurality of the dried sized glass fiber strands are then produced into a roving by any conventional process and postbaked at around 125° C. for around 4 hours. The roving is then ready for use with sheet molding compound, bulk molding compound, and thick molding compounds to produce composites, where the roving may be chopped into chopped strands or used as continuous strands.

Further illustration of the preferred embodiment of the present invention are obtained from the following examples.

EXAMPLE I

A one hundred gallon (378.5 liter) amount of the sizing composition of the present invention was prepared in the following manner.

An amount of 28,875 grams of water dispersible polyester resin in an aqueous solution as 76 weight percent solids for a 4.4 weight percentage of the aqueous size (RS-5974 available from PPG Industries, Inc.) was combined with 1,875 grams of unhydrolyzed gamma-aminopropyltriethoxysilane (A-1100 available from Union Carbide Corporation) in a main vessel having a high shear mixer. To this mixture there was added 76,000 ml of water and 1,265 grams (0.08 weight percent since 35 percent solids) of anionic emulsifier (Abex 18X), and 1,265 grams of tricresyl phosphate plasticizer (Phosphlex 179A) with agitation to form an emulsion. To this emulsion there was added 55,950 grams (3.74 weight percent of aqueous size 35 percent solids) of water solubilizable polyester resin with pendant and terminal carboxyl functionality (Freeman Resin 40-5018 available from Freeman Chemical Co.) with 68,500 ml of water.

To a premix tank there was charged with agitation 34,000 ml of water, 10 ml of acetic acid and 3,000 gms of alph-methacryloxypropyltriethoxysilane. The contents of this premix tank are added to the conents of the emulsification tank with agitation.

An amount of 46,450 grams (4.7 weight percent of aqueous size 53 percent solids) of epoxidized polyvinylacetate acrylic copolymer (National Starch Resyn N25-1971) in 39,000 ml of water and 375 grams (0.07 weight percent) of gamma-aminopropyltriethoxysilane were combined in a premix tank for a residence time of around 5 minutes at homogenous mixing. After this time the product was transferred to the main vessel with the other materials.

In addition, an amount of 6,335 grams (0.58 weight percent since 48% solids) of urea formaldehyde resin Resimene 970 in 22,000 ml of water was added to the contents of the main tank with agitation. To this mixture there was added 40 ml of an antifoaming agent (SAG 470). In this example the water used was deionized water.

The following table shows the component in weight percent of the sizing composition:

TABLE I

| | |
|---|---|
| Water dispersible polyester resin (80% solids) | 4.4 |
| Water solubilizable polyester resin (35% solids) | 3.7 |
| Anionic emulsifier (35% solids) | .08 |
| Tricresyl phosphate | .24 |
| Aminopropyltriethoxysilane (added to polyester) | .36 |
| Methacryloxypropyltrimethoxysilane | .57 |
| Interaction product of aminopropyltriethoxysilane and Epoxidized polyvinyl acetate copolymer | 4.8 |
| Urea formaldehyde resin (48 percent solids) | 0.58 |
| Deionized water | 85.27 |

The sizing composition was used to size K-37 glass fiber strands during forming where the collet was rotating at 4,500 revolutions per minute. Preferably during formation of the strands, the strands were wound on the forming package with the use of the traversing spiral of U.S. Pat. No. 4,239,162 (Barch et al) hereby incorporated by reference. A plurality of forming packages as above formed were dried in an oven at 115° C. to 130° C. for 4 hours. The above sizing solution provides a glass strand with about 2.00 +0.2 percent by weight of the dried sizing composition on the strand based on the total weight of the glass with the dried residue of the sizing composition thereon. Twelve of the packages were mounted on a creel, braided into roving, and collected on a rotating spindle to form a roving ball and post baked at a temperature in the range of 250° F. to about 280° F. preferably 255° F. (124° C. to 132° C.) for 4 hours.

ILLUSTRATIVE EXAMPLE

Sized glass fiber strands were prepared using an aqueous sizing composition similar to Example 1 except only the epoxidized copolymer and not the interaction product was used. The size had the following formulation:

| | | |
|---|---|---|
| Water dispersible polyester resin (80% solids) | 5.7 | |
| Water solubilizable polyester resin (35% solids) | 4.3 | |
| Anionic emulsifier (5 solids) | .32 | |
| Tricresol phosphate | .32 | |
| Aminopropyltriethoxysilane (added to polyester) | .48 | (Total amount) |
| Methacryloxypropyltrimethoxysilane | .77 | |
| Epoxidized polyvinyl acetate copolymer | 6.1 | |
| Urea formaldehyde resin (48 percent solids) | 1.7 | |
| Deionized water | 80.38 | |

The sized glass fiber strands of the same type as the sized glass fiber strands of Example I were produced into rovings and used to produce reinforced polyester composites.

In the production of the sized glass fiber strands, the strands were dried at a temperature of 285° F. (141° C.) for 11 hours.

Roving balls of Example I and Illustrative Example strands were used to produce molded bulk molding compound and sheet molding compound composites which were tested for tensile strength, flexural strength and compact strength. These values are compared to molded BMC and SMC panels produced with sized glass fibers commercially available from Owens Corning Fiberglas Corporation under the trade designation 951 and 956, hereinafter referred to as A and B respectively.

TABLE II

Mechanical Properties of Composites of Glass Mat in Budd Hi Filler Polyester System Adjusted at 26% Glass

| Polyester Composite with Mat of following glass fiber strand | Flexural Strength $\times 10^3$ | Flexural Modulus $\times 10^6$ | Tensile Strength $\times 10^3$ | Impact Strength Ft-Lbs/In |
|---|---|---|---|---|
| Illustrative Ex. | 23.2 | 1.77 | 9.18 | 12.0 |
| Example I 2-split | 25.8 | 1.82 | 10.6 | 10.2 |
| Commerical A 3-split | 23.2 | 1.70 | 9.23 | 10.5 |
| Commercial B 3-split | 27.7 | 1.72 | 10.4 | 11.8 |

TABLE III

Mechanical Properties of Composites of Glass Mats in PPG Phase I Polyester System Adjusted at 26% Glass

| Identification | Flexural Strength $\times 10^3$ | Flexural Modulus $\times 10^6$ | Tensile Strength $\times 10^3$ | Impact Strength Ft-Lbs/In |
|---|---|---|---|---|
| Illustrative | 28.1 | 1.59 | 9.96 | 13.5 |
| Example I 2-split | 25.9 | 1.49 | 11.8 | 13.1 |
| Commercial A (3-split) | 25.4 | 1.45 | 10.7 | 14.3 |
| Commercial B | 28.1 | 1.54 | 11.7 | 14.3 |

TABLE III-continued

Mechanical Properties of Composites of Glass Mats in PPG Phase I Polyester System Adjusted at 26% Glass

| Identification | Flexural Strength × 10³ | Flexural Modulus × 10⁶ | Tensile Strength × 10³ | Impact Strength Ft-Lbs/In |
|---|---|---|---|---|
| (3-split) | | | | |

TABLE IV

| PREDRYING TEMP., °F. | SPLIT | FUZZ (G/100 LB) | COMPACTNESS | WET-OUT Ex. 1 | WET-THROUGH Commercial A | Ex. 1 | Commercial A |
|---|---|---|---|---|---|---|---|
| 240° F. (S) | 2/S | >1 | BETTER THAN Commercial B | 80 | 90 | 5/75 | 10/90 |
| 250° F. (R) | 2/S | 0.6 | BETTER THAN Commercial B | 80 | 90 | 5/75 | 10/90 |
| 260° F. (Q) | 2/S | 0.2 | BETTER THAN Commercial B | 85 | 85 | 10/85 | 10/90 |
| 260° F. (T) | 3/S | 0.3 | EQUAL TO Commercial B | 80 | 85 | 5/85 | 10/90 |
| 270° F. (P) | 2/S | 0.1 | WORSE THAN Commercial B | 90 | 85 | 15/95 | 10/90 |

Table IV presents test results for compactness, wet-through and wet-out of sheet molding compound having the sized glass fiber strands of the present invention and compounds having the commercial strands. The molding compounds with the sized glass fiber strands having the sizing composition of Example I dried at different temperatures were compared to molding compounds having commercially available glass fiber strand roving as previously described. The compaction was measured by taking a cross section of the composite and measuring the height of the cross section.

Wet-through is tested following compaction of SMC and prior to wrap-up of the SMC on the core. The number of strands visible by color contrast and the degree of strand protrudence against the film are visually observed and given a rating. The visual ratings are given in 5 percent gradients.

Wet-out is visually observed as soon as possible after wrap-up of the SMC and before cutting of the SMC into square foot samples for determination of sheet weight. The wet-out is measured by rolling out the SMC on a table and all dry glass or excess paste is trimmed from the end of the sheet. Three sections, 12–18 inches long, are cut one after another from the compound. Each of these sections are stripped to delaminate the compound on a cross-sectional bias perpendicular to the SMC machine direction and across both test glass products. Any dry strands present appear at the center of the bias. The amount of wet-out is compared to visual standards using 5 percent gradients.

The foregoing description has described an aqueous sizing composition and method for producing same used in treating glass fibers to produce sized glass fiber strands yielding improved properties when used with molding compounds. The use of the sized glass fiber strands for reinforcing polymeric materials such as sheet molding compounds, bulk molding compounds, and thick molding compounds and thermoplastic polymers produces a reinforcement with good properties of compaction, flexibility and tensile strength. These sized glass fiber strands achieve this feat without any detrimental affects to the processability of the glass fiber strands such as little or no increase in fuzz, fly or static generation. These benefits are achieved by using an aqueous sizing composition that has a substantial amount of a cross-linkable film forming polymer and an interaction product of an epoxidized polar thermoplastic copolymer and an amino-containing organo-silane coupling agent in an amount of about 2 to about 12 weight percent of the aqueous sizing composition along with additional silane coupling agents and lubricants. The epoxidized polar thermoplastic copolymer has about 2 to about 12 parts of epoxidized monomer per 100 parts of the thermoplastic copolymer. The cross-linkable film formers can be a water solubilizable, unsaturated polyester resin and a water dispersible unsaturated polyester resin, where the one or more cross-linkable film formers is in an amount predominant to the amount of the interaction product. The sizing composition could also have one or more silane coupling agents, emulsifiers, plasticizers and urea formaldehyde condensate polymer. Sized glass fibers having the sizing composition of the present invention can be used to reinforce thermoplastic resins or thermosetting resins. Further, the sized glass fibers formed with the sizing composition of the present invention can be used as roving, filament winding, continuous glass fiber mat, chopped strand mat and pultrusion in reinforcing polymeric matrices to have superior reinforcement characteristics.

We claim:

1. One or more glass fiber strands where the glass fibers have the dried residue of an aqueous sizing composition for use in reinforcing polymeric materials, wherein the aqueous sizing composition comprises:
    (a) a major amount of the solids of the sizing composition being one or more cross-linkable film forming polymers compatible with the polymeric matrix to be reinforced with glass fibers,
    (b) one or more organo-silane coupling agents in an amount up to about 20 weight percent of the solids of the sizing composition,
    (c) an interaction product of an epoxidized polar thermoplastic copolymer and an unhydrolyzed or partially hydrolyzed amino-containing organo-silane coupling agent in an amount of about 10 weight percent up to about 50 weight percent of the solids of the sizing composition, wherein the interaction product is formed by contacting the epoxidized copolymer which has about 2 to about 12 parts of epoxidized monomer per 100 parts of copolymer and which has a glass transition temperature from about −10° C. to about 70° C. with the amino-containing organo-silane coupling agent wherein the amount of the amino silane coupling agent is in the range of about 0.1 to about 1.2 weight percent of an aqueous mixture having at least 20 weight percent of the epoxidized copolymer, and
    (d) an amount of water sufficient to make the percent solids of the sizing composition in the range of about 2 to about 30 weight percent.

2. Glass fiber strand of claim 1 wherein the aqueous sizing composition further comprises urea formaldehyde condensate polymer in an amount in the range of about 0.5 to about 3 weight percent of the aqueous sizing composition.

3. Glass fiber strand of claim 1, wherein the cross-linkable film forming polymer is a water solubilizable unsaturated polyester resin solubilizable with a nitrogenous compound.

4. Glass fiber strand of claim 1 where the cross-linkable film forming polymers are a water solubilizable unsaturated polyester polymer and a water dispersible unsaturated polyester polymer, wherein the amount of the water dispersible polyester polymer is greater than the amount of the water solubilizable polyester polymer and that the combined amounts of these polyester polymers make up the major portion of the solids of the aqueous sizing composition.

5. Glass fiber strand of claim 1 or 4 wherein the organo-silane coupling agent is an amino-organo-silane coupling agent.

6. Glass fiber strand of claim 1, wherein the aminosilane coupling agent is gamma-aminopropyltriethoxysilane.

7. Glass fiber strand of claim 1, wherein the organo-silane coupling agents are an amino-organo-silane coupling agent and a vinyl containing organo-silane coupling agent.

8. Glass fiber strand of claim 4 wherein the aqueous sizing composition further comprises a plasticizer.

9. Glass fiber strand according to claim 4 wherein the aqueous sizing composition further comprises an emulsifying agent selected from anionic, cationic or nonionic emulsifying agents or mixtures thereof.

10. Glass fiber strand of claim 1, wherein the epoxidized polar thermoplastic copolymer is selected from epoxidized polyvinylacetate, epoxidized polyacrylate, epoxidized polyesters, epoxidized polyurethane, epoxidized polyolefin wherein the other comonomer forming the—epoxidized polar thermoplastic copolymer is different from the first comonomer and selected from vinyl acetate, alkylenes, acrylates, polyester repeating units and polyurethane repeating units.

11. Glass fiber of claim 4, wherein the water solubilizable, unsaturated polymer has pendant and terminal carboxyl functionality.

12. Glass fiber sized with an aqueous sizing composition wherein the composition has a water solubilizable, condensation, cross-linkable, first unsaturated polyester resin, said polyester resin substantially insoluble in aromatic solvents when cross-linked; a second unsaturated water dispersible and insoluble polyester resin, said second polyester being insoluble in said first polyester resin in a water solution, and said second polyester resin preventing the migration of said sizing composition; a plasticizer; a first silane coupling agent to promote adhesion between the glass fibers and the resin matrix, a second silane coupling agent to control the wetting of said glass fibers by said first silane coupling agent; a thermoplastic polymer being of sufficient low molecular weight to impart pressure sensitive adhesive characteristics to said sizing composition; and a major amount of water, the improvement comprising: the thermoplastic polymer being an interaction product, of an unhydrolyzed or partially hydrolyzed amino organo-silane coupling agent and of an epoxidized polyvinyl acetate acrylic copolymer having about 2 to about 12 parts of glycidyl acrylate to about 100 parts of the copolymer which is present in the sizing composition in an amount in the range of about 2 to about 12 weight percent of the aqueous sizing composition.

13. Glass fiber of claim 12 which has in the aqueous sizing composition a gelling agent.

14. Glass fiber of claim 12, wherein the aqueous sizing composition has a total solids in the range of about 2 to about 30 weight percent of the composition.

15. Glass fiber of claim 12, wherein in the aqueous sizing composition, the first silane coupling agent is an amino-functional silane coupling agent.

16. Glass fiber of claim 12, wherein the aqueous sizing composition has present about 0.5 to about 3 weight percent of the aqueous sizing composition of urea formaldehyde condensate polymer.

17. Glass fiber of claim 12, wherein in the aqueous sizing composition one of the coupling agents present is an unhydrolyzed or partially hydrolyzed amino-functional silane which is added to the first or second polyester resin.

18. Glass fibers of claim 12, wherein in the sizing composition the water solubilizable unsaturated polyester resin has pendant and terminal carboxyl functionality.

19. Glass fibers of claim 12, wherein in the aqueous sizing composition the water dispersible unsaturated polyester resin is present in an amount greater than the water solubilizable unsaturated polyester resin.

20. Glass fibers treated with an aqueous sizing composition that are gathered into one or more glass fiber strands and dried to remove most of the moisture wherein the aqueous sizing composition, comprises:
in weight percent of the aqueous sizing composition 1 to about 12 weight percent of a water solubilizable, condensation, cross-linkable first unsaturated polyester resin having pendant and terminal carboxyl functionality;
about 2 to about 12 weight percent of a second unsaturated water dispersible and insoluble polyester resin, said second polyester resin being insoluble in said first polyester resin in a water solution and said second polyester resin preventing the migration of said sizing composition and said second polyester always being present in an amount equal to or greater than the first polyester resin;
about 2 to about 12 weight percent of a plasticizer;
about 0.1 to about 2 weight percent of a amino-functional silane coupling agent;
about 0.1 to about 2 weight percent of a second silane coupling agent to control the wetting of said glass fibers;
about 2 to about 12 weight percent of an interaction product of any epoxidized polyvinyl acetate copolymer wherein there is about 2 to about 12 parts of epoxidized monomer per 100 parts of vinyl acetate copolymer and an unhydrolyzed or partially hydrolyzed amino-containing organo-silane coupling agent wherein the interaction product is formed by contacting the epoxidized copolymer which has a glass transition temperature from about −10° C. to about 70° C. with the amino-containing organo-silane coupling agent wherein the amount of the amino silane coupling agent is in the range of about 0.1 to about 1.2 weight percent of an aqueous mixture having at least 20 weight percent of the epoxidized copolymer, and
about 0.5 to about 3 weight percent of urea formaldehyde condensate polymer; and a major amount of water.

21. Dried, sized glass fiber strands according to claim 20 gathered into a bundle of strands that are heated to a temperature of around 125° C. for around 4 hours.

* * * * *